(12) United States Patent
Foltz (10) Patent No.: US 6,308,735 B1
(45) Date of Patent: Oct. 30, 2001

(54) WELDABLE FUEL TANK VALVE APPARATUS

(75) Inventor: Dean C. Foltz, Shelbyville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/530,287

(22) PCT Filed: Nov. 25, 1998

(86) PCT No.: PCT/US98/25317

§ 371 Date: Jan. 5, 2001

§ 102(e) Date: Jan. 5, 2001

(87) PCT Pub. No.: WO99/27284

PCT Pub. Date: Jun. 3, 1999

Related U.S. Application Data (60) Provisional application No. 60/066,838, filed on Nov. 25, 1997.

(51) Int. Cl.[7] .................................................. F16K 24/00
(52) U.S. Cl. ......................... 137/587; 251/144; 251/152; 251/367; 220/89.1
(58) Field of Search .............................. 137/587, 43, 590; 251/144, 152, 367; 220/89.1

(56) References Cited

U.S. PATENT DOCUMENTS

| | | |
|---|---|---|
| 3,385,468 | 5/1968 | Fleming et al. . |
| 4,351,350 | 9/1982 | Crute . |
| 4,646,772 | 3/1987 | Bergsma . |
| 4,694,870 | 9/1987 | Vize . |
| 4,702,268 | 10/1987 | Ambruster et al. . |
| 4,730,652 | 3/1988 | Bartholomew . |
| 4,753,262 | 6/1988 | Bergsma . |
| 5,028,244 | 7/1991 | Szlaga . |
| 5,139,043 | 8/1992 | Hyde et al. . |
| 5,404,907 * | 4/1995 | Benjey et al. .................... 251/144 X |
| 5,443,098 | 8/1995 | Kertesz . |
| 5,954,091 | 9/1999 | Leadford . |
| 6,189,567 * | 2/2001 | Foltz .................................... 137/587 |

FOREIGN PATENT DOCUMENTS 0 597 314 A    11/1992  (DE) .

* cited by examiner

Primary Examiner—Kevin Lee
(74) Attorney, Agent, or Firm—Barnes & Thornburg (57) ABSTRACT

An apparatus is provided that includes a valve assembly and a retainer that couples the valve assembly in a fuel tank. The valve assembly includes a housing having a body portion, a flange coupled to the body portion and retainer blocks extending from the body portion spaced-apart from the flange. A valve is positioned to lie in the housing. The retainer is adapted to be coupled to an exterior surface of the tank. The retainer includes a body portion that defines a passageway sized to receive the body portion of the housing and a ring coupled to the body portion of the retainer and formed to extend into the passageway. The flange and retainer blocks cooperate with the body portion of the retainer and ring to couple the valve assembly and retainer together.

39 Claims, 5 Drawing Sheets

WELDABLE FUEL TANK VALVE APPARATUS

This claims priority under 35 U.S.C. §119(e) of Ser. No. 60/066,838 filed Nov. 25, 1997.

BACKGROUND AND SUMMARY OF THE INVENTION

This invention relates to a fuel tank valve apparatus and particularly, to a fuel tank valve apparatus that is suitable for use with a fuel tank constructed of a polymeric material. Most particularly, this invention relates to a valve apparatus that is welded to a fuel tank to mount the valve assembly in a fixed position in an aperture formed in the fuel tank.

Mounting assemblies that are used to mount a venting valve assembly in a top wall of a fuel tank are known. See for example, U.S. Pat. No. 4,966,189 to Harris, which is incorporated herein by reference.

According to the present invention, a fuel tank valve apparatus is provided that includes a valve assembly that has a housing with a body portion, a flange coupled to the body portion, a retainer block, and a valve positioned to lie in the body portion. The retainer block extends away from the body portion spaced-apart from the flange. In addition, the fuel tank valve apparatus includes a retainer adapted to be coupled to an exterior surface of the fuel tank. The retainer includes a body portion defining a passageway sized to receive the body portion therein and a ring coupled to the body portion and extending into the passageway. The flange and retainer block of the housing cooperate with the body portion and the ring of the retainer respectively to couple the valve assembly and retainer together.

In preferred embodiments, the ring includes a fixed-end portion coupled to the body portion and a ramped free-end portion extending into the passageway. The free-end portion includes a series of tabs that are spaced-apart relative to one another. Each tab is formed to flex radically outwardly toward the body portion upon engaging an angled cam surface provided on one of the retainer blocks during insertion of the valve assembly downward through the passageway formed in the body portion of the retainer and the aperture formed in the fuel tank wall.

The valve assembly includes a cylindrical housing having an inlet at its bottom end and an annular mounting flange near its top end and an outlet portion coupled to the top end of the housing and formed to include a fuel vapor discharge tube. The valve assembly also includes four circumferentially spaced-apart retainer blocks and each retainer block includes a downwardly facing angled cam surface an upwardly facing retainer surface.

During insertion of the valve assembly into the fuel tank through the passageway formed in the body portion of the retainer and the aperture formed in the fuel tank wall (after welding the retainer in its mounted position on the fuel tank wall surrounding the aperture formed in the fuel tank wall), some of the flexible tabs on the ring coupled to the mounted retainer are cammed "out of the way" by the downwardly facing angled cam surface on the four retainer blocks to allow the valve assembly to be moved through the passageway formed in the body portion of the retainer to engage the annular mounting flange near the top end of the cylindrical housing against a top end of the welded retainer. At this point, the flexed tabs "snap back" to their original positions and engage against the upwardly facing retainer surfaces formed on the retainer blocks to retain the valve assembly in a mounted position in the retainer that is welded to the fuel tank.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
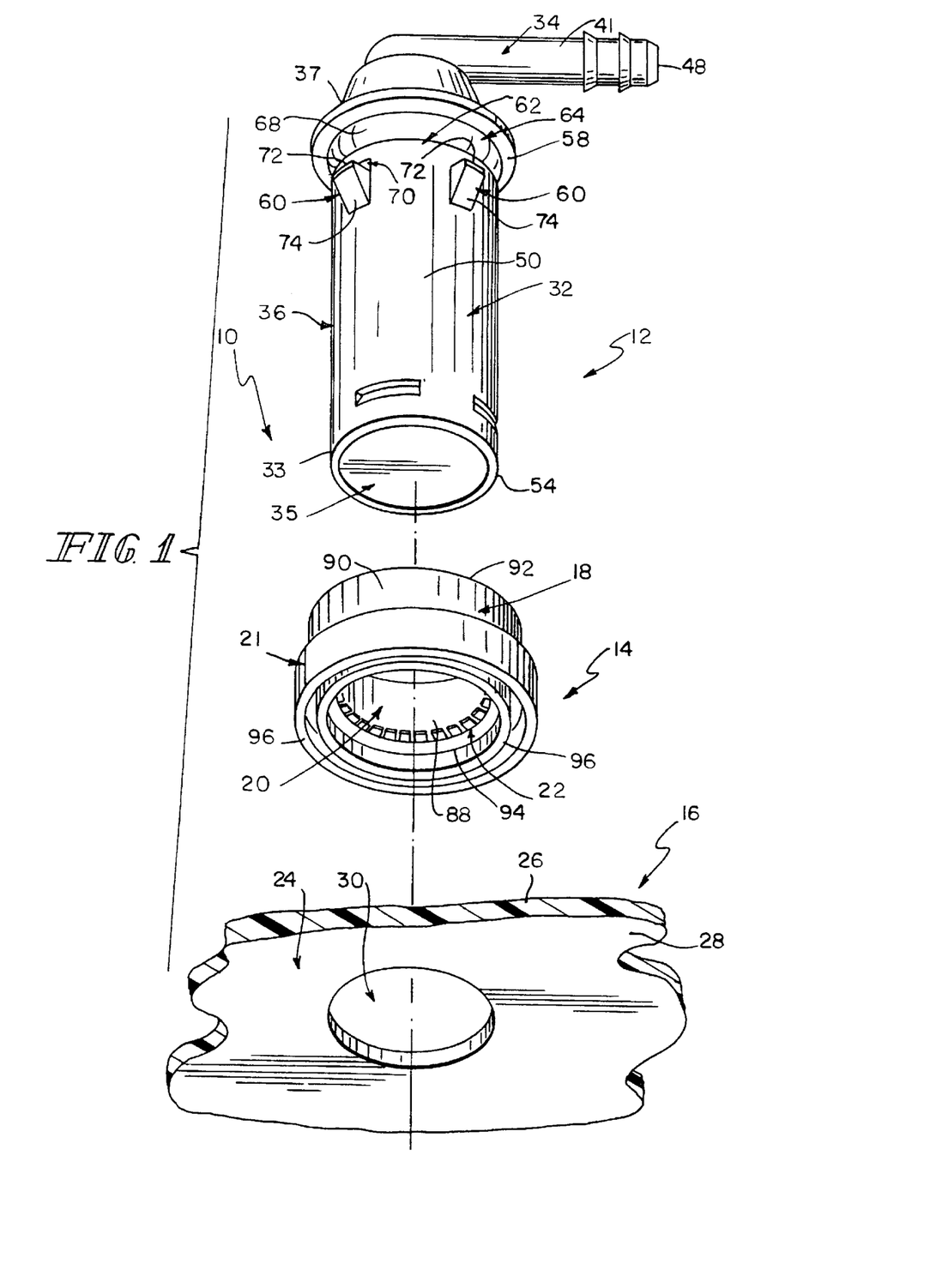
FIG. 1 is an exploded perspective assembly view of a fuel tank valve apparatus in accordance with the present invention with portions broken away, showing a valve assembly, a fuel tank wall formed to include an aperture sized to receive a cylindrical body portion of the valve assembly therein, and a retainer below the valve assembly and above the fuel tank wall; the retainer including an axially upper portion configured to be coupled to the valve assembly and a larger diameter axially lower portion configured to be welded to an exterior surface of the fuel tank wall to mount the valve assembly in a fixed position in the aperture formed in the fuel tank wall.

As shown in FIG. 1, a fuel tank valve apparatus 10 includes a valve assembly 12 and a retainer 14 that couples valve assembly 12 in a fuel tank 16. Retainer 14 is formed to be welded to fuel tank 16 to hold secure valve assembly 12 in a fixed place in fuel tank 16. Specifically, retainer 14 prevents detachment of valve assembly 12 from fuel tank 16 to permit valve assembly 12 to regulate the flow of liquid fuel and fuel vapor (not shown) from fuel tank 16 to a vapor recovery canister (not shown) or other destination outside fuel tank 16.

Referring now to FIG. 1, retainer 14 includes a body portion 18 formed to include a central passageway 20 and a weld flange 21 that extends away from passageway 20 for engagement with fuel tank 16. Retainer 14 also includes a mount ring 22 that is distinct from body portion 18 and extends from body portion 18 into passageway 20. Further, body portion 18 and ring 22 cooperate to hold valve assembly 12 therebetween so that valve assembly 12 is secured in a fixed position within fuel tank 16. While retainer 14 will be described with reference to fuel tank 16 and valve assembly 12, it is within the scope of this disclosure to use retainer 14 to couple valve assemblies containing any number of valves therein in a wide variety of fuel tanks.

Figure 2:
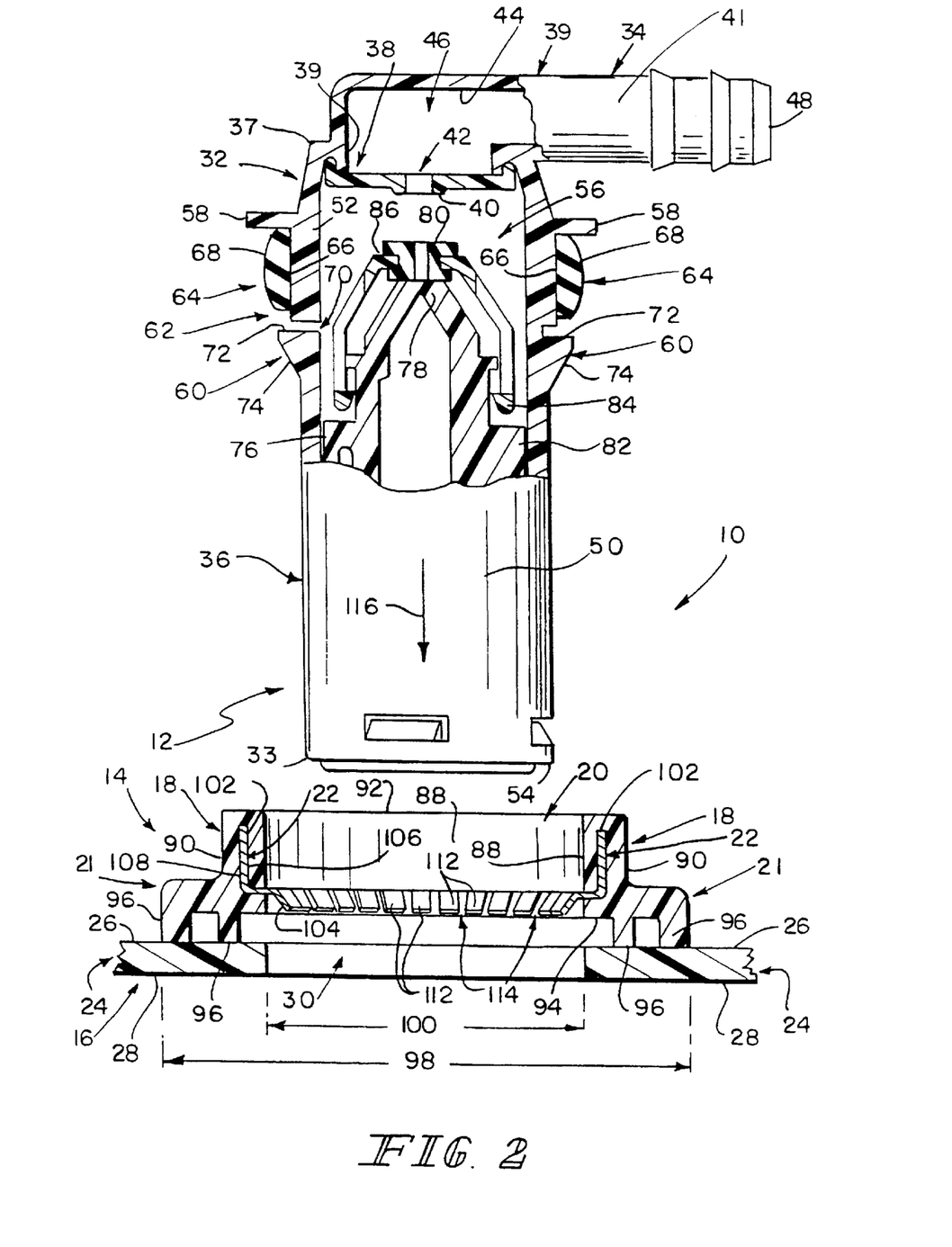
FIG. 2 is a partial cross-sectional view of the fuel tank apparatus of FIG. 1 showing the retainer coupled to the exterior surface of the fuel tank wall and the valve assembly positioned to lie above and in alignment with a central passageway formed in the retainer and the underlying aperture formed in the fuel tank wall.

Referring now to FIGS. 1 and 2, retainer 14 is formed to be coupled to fuel tank 16. Fuel tank 16 is constructed of a polymeric material that lends itself to blow-molding, such as, for example polyethylene. Fuel tank 16 includes a top wall 24 that has an exterior surface 26, to which retainer 14 is coupled and an interior surface 28 located inside of fuel tank 16. In addition, a vent-outlet aperture 30 is formed in top wall 24 and extends between exterior and interior surfaces 26, 28.

Figure 3A:
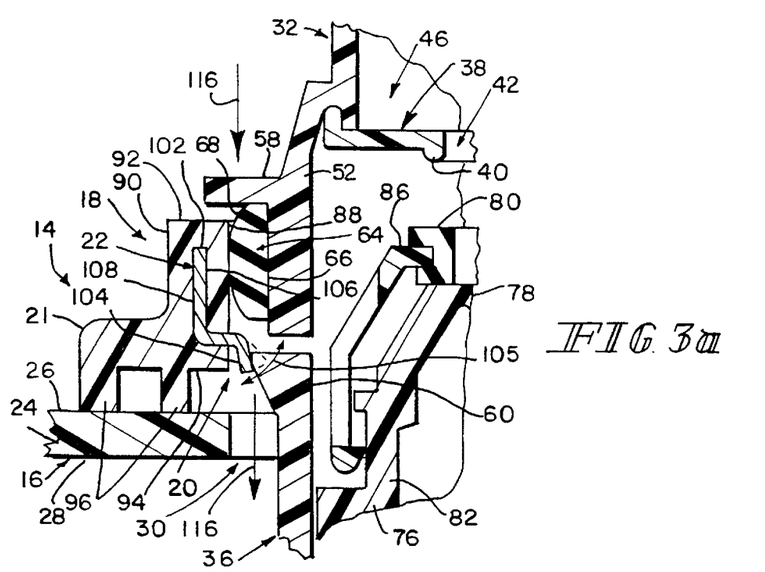
FIG. 3a is an enlarged sectional view of the fuel tank apparatus of FIG. 2 showing insertion of the valve assembly into the fuel tank through the passageway formed in the retainer and the aperture formed in the fuel tank wall and the retainer block deflecting the free-end portion of the ring included in the retainer to a generally flat position adjacent to the inner side of the body portion.
Figure 3B:
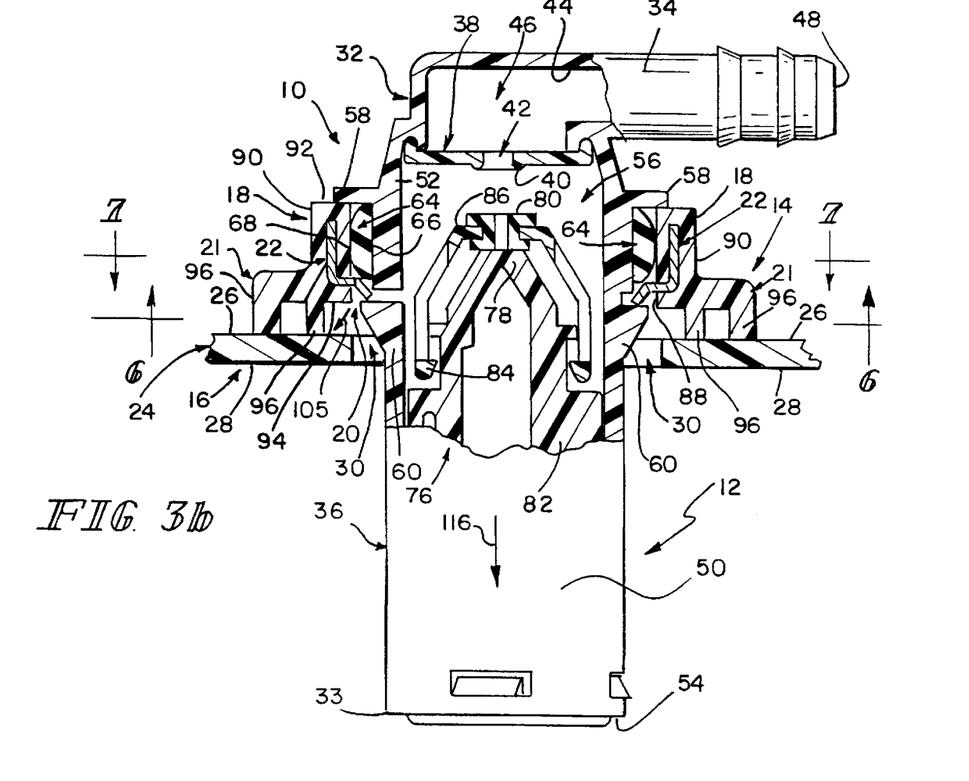
FIG. 3b is a view similar to FIG. 2 following insertion of the valve assembly through the passageway formed in the retainer and the aperture formed in the fuel tank wall showing the valve assembly being coupled to the axially upper portion of the retainer and the axially lower portion of the retainer being welded to the exterior surface of the fuel tank wall.

Valve assembly 12 is retained in fuel tank 16 by retainer 14. Referring now to FIGS. 2 and 3, valve assembly 12 includes a housing 32 constructed from acetal and including a bottom end 33 having an inlet 35 an annular mounting flange 58 near its top end 37 and an outlet portion 39 coupled to top end 37 of housing 32 and formed to include a fuel vapor discharge tube 41. Referring to FIG. 2, outlet portion 39 of housing 32 has an upper portion 34 that remains outside of fuel tank 16. In addition, top and bottom ends 37, 33 define a lower portion 36 of housing that extends through passageway 20 into fuel tank 16 to communicate with fuel vapor and liquid fuel contained in fuel tank 16. A partition 38 extends between upper portion 34 and lower portion 36. Partition 38 of housing 32 is formed to include an axially downwardly-facing, valve seat 40. Valve seat 40 defines an outlet 42.

Referring now to FIG. 3b, upper portion 34 of housing 32 is configured to extend away from retainer 14 when the vale assembly 12 is in a filly mounted position in passageway 20 of retainer 14. Upper portion 34 includes an interior wall 44 that defines a vapor-discharge chamber 46 and a vapor-discharge opening 48. Lower portion 36 of housing 32 extends through passageway 20 of retainer 14 and includes a generally cylindrical body portion 50. Body portion 50 includes an axially upper end 52, an opposite terminal end 54, and a central passage 56 extending between upper and terminal ends 52, 54. In addition, lower portion 36 includes a generally annular flange 58 appended to upper end 52 of body portion 50 and four retainer blocks 60 circumferentially spaced-apart from flange 58. As shown in FIGS. 1 and 2, retainer blocks 60 cooperate with flange 58 to define a retention portion 62 therebetween.

Figure 4:
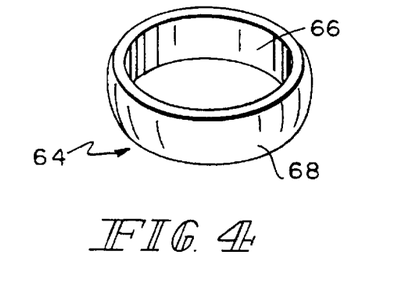
FIG. 4 is a perspective view of an annular gasket shown in FIG. 3b.

Flange 58, as shown again in FIG. 3b, is sized to block movement of body portion 58 through passageway 20 of body portion 18 toward fuel tank 16. A gasket 64 is positioned to lie within retention portion 62 adjacent to flange 58 to establish a vapor and liquid seal between body portion 50 and body portion 18 when flange 58 engages upper end 92 of body portion 18. Gasket 64 is shown in FIG. 4 and includes an inner side 66 formed to engage body portion 50 and an outer side 68 formed to engage body portion 18. It will be appreciated that this sealed end connection could be accomplished in a number of different ways as long as fuel vapor or liquid fuel is unable to escape fuel tank 16 through the joint between flange 58 and body portion 18.

Retainer blocks 60, as shown in FIG. 2, are positioned to lie adjacent to notches 70 in body portion 50 and are formed to engage ring 22 to block movement of body portion 50 through passageway 20 of body portion 18 away from fuel tank 16 once valve assembly 12 is in the fully mounted position. While only one retainer block 60 and notch 70 will be discussed hereafter, the description applies to each retainer block and each notch. Retainer block 60 projects in an axially upward direction away from terminal end 54 of body portion 50 toward notch 70 formed in body portion 50. Retainer block 60 includes an upwardly facing retainer surface 72 and an angled, radially outwardly facing cam surface 74 as shown in FIGS. 1 and 2. Retainer surface 72 is positioned so that it will engage ring 22 when valve assembly 12 is moved toward the fully mounted position in passageway 20 as shown in FIG. 3b.

A valve 76 is installed in body portion 50 to control fluid flow through outlet 42. As shown in FIG. 2, valve 76 includes a first nipple 78, a second nipple 80, and a float member 82 arranged in central passage 56 of body portion 50. Float member 82 is movable in central passage 56 to control the discharge of liquid fuel and pressurized fuel vapor from fuel tank 16 through outlet 42 during, for example, sloshing of liquid fuel in fuel tank 16 as a result of vehicle movement of cornering, development of high pressure of fuel vapor in fuel tank 16, filling fuel tank 16 with liquid fuel during refueling, and tilting or inversion of vehicle containing tank as a result of vehicle rollover. Float member 82 includes a top shell 84 formed to include second nipple 80 at its upper end 86. Reference is made to U.S. Patent Application entitled "Low-Leak Two-Stage Reopening Device" to Dean C. Foltz which is filed herewith, for a description of a suitable valve for vent valve apparatus and which is incorporated herein by reference.

As shown in FIG. 3b retainer 14 is coupled to lower portion 36 of housing 32 and lies between fuel tank 16 and upper portion 34 of housing 32. Retainer 14 is constructed of a polymer that lends itself to welding to fuel tank 16, such as, for example high density polyethylene. It is within the scope of this disclosure to construct retainer 14 from a wide variety of polymers suitable for welding to fuel tank 16.

Figure 5:
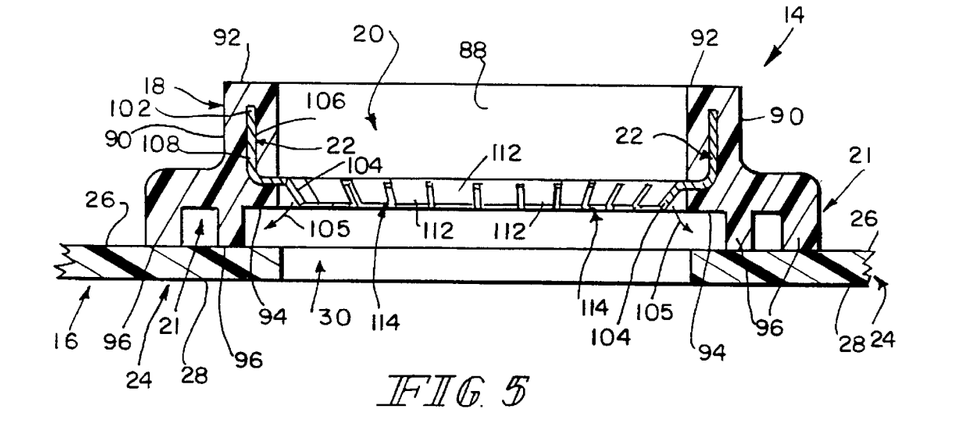
FIG. 5 is a cross-sectional view of a mount ring coupled to the axially upper portion of the retainer and used to couple the valve assembly to the retainer as shown in FIG. 3b, the mount ring including a fixed-end portion coupled to the body portion and a free-end portion extending into the passageway formed in the body portion.

Referring now to FIG. 3b, body portion 18 of retainer 14 is configured to be coupled between flange 58 and retainer block 60 of body portion 50 to block movement of valve assembly 12 in aperture 30 of fuel tank 16. As shown in FIG. 5, body portion 18 further includes an inner side 88 configured to face body portion 50, an outer side 90, an axially upper portion 92 extending about the periphery of body portion 18, and an opposite lower portion 94. Inner side 88 of body portion 18 defines passageway 20 that extends between outer and lower portions 92, 94.

Figure 6:
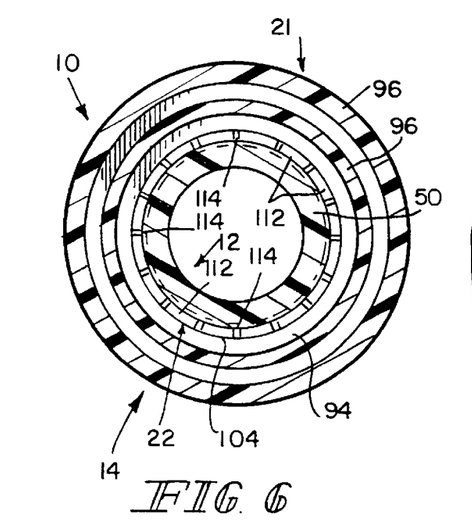
FIG. 6 is a cross-sectional view taken along lines 6—6 of FIG. 3b showing a weld flange including concentric spaced-apart contacts and showing the free-end portion of the ring surrounding the valve assembly.
Figure 7:
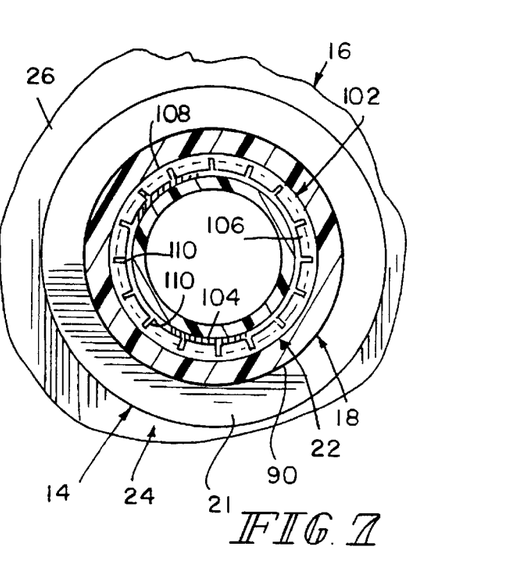
FIG. 7 is a cross-sectional view taken along lines 7—7 of FIG. 3b showing the weld flange coupled to the exterior surface of the fuel tank wall and the valve assembly extending through the passageway formed in the retainer.

Weld flange 21 of body portion 18 is configured to be coupled to exterior surface 26 of fuel tank 16, as shown in FIGS. 5 and 7. Referring now to FIGS. 5 and 6, weld flange 21 extends from outer side 90 of body portion 18 adjacent to lower portion 94. Weld flange 21 includes circumferential weld feet or contacts 96 spaced-apart from one another. Contacts 96 are formed to engage exterior surface 26 of fuel tank 16. Contacts 96 and fuel tank 16 are welded together using suitable known techniques such as hot plate welding to establish a vapor and liquid seal therebetween. In addition, as shown in FIG. 2, weld flange 21 has a predetermined dimension 98 that is greater than a second dimension 100 of aperture 30 to prevent retainer 14 from moving through aperture 30.

Figure 8:
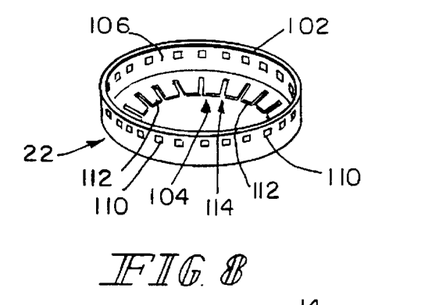
FIG. 8 is a perspective view of the mount ring of FIG. 1.

Ring 22 of retainer 14 is constructed of a metal, such as for example, stainless steel. Continuing to refer to FIG. 2, ring 22 includes a fixed-end portion 102 coupled to body portion 18 and an opposite ramped free-end portion 104 extending into passageway 20 spaced-apart from fixed-end portion 102. As best shown in FIGS. 5 and 8, fixed-end portion 102 is generally L-shaped in cross-section and includes an inner surface 106, an outer surface 108, and notches 1 10 extending between inner and outer surfaces 106, 108. Notches 110 disrupt inner and outer surfaces 106, 108 to aid in gripping body portion 18. Additionally, free-end portion 104 includes tabs 112 positioned to lie in a spaced-apart relationship relative to one another. Tabs 112 are separated by slots 114. As shown in FIG. 5, free-end portion 104 normally flexes away from inner side 88 of body portion 18 to position free-end portion 104 in a normal elevated position. Given the flexibility of ring 22, free-end portion yieldably deflects to a generally flat position, adjacent to inner side 88 as shown by arrow 105 when pressed by retainer block 60, as will be discussed hereafter, as shown in FIG. 3a.

Valve assembly 12 and retainer 14 are manufactured separately and subsequently assembled in an axial press-fit. In order to assemble fuel tank valve apparatus 10, an assembly worker illustratively grasps retainer 14 and places contacts 96 of weld flange 21 upon fuel tank 16 such that passageway 20 is aligned with aperture 30 in fuel tank 16, as shown in FIG. 5. Retainer 14 and fuel tank 16 are welded together using suitable known techniques such as hot plate welding. Thus, retainer 14 is effectively integrated into fuel tank 16 by the welding process. Once coupled to fuel tank 16, retainer 14 is prevented from moving on exterior surface 26 of fuel tank 16.

Once retainer 14 has been coupled to fuel tank 16, valve assembly 12 is coupled to retainer 14. Referring now to FIG. 2, the worker grasps housing 32 of valve assembly 12 and aligns body portion 50 with passageway 20 of body portion 18. Once aligned, the worker simply slides body portion 50 through passageway 20 into aperture until side-face 74 of retainer block 60 engages free-end portion 104 of ring 22. As shown in FIG. 3b, housing 32 is further pressed in an axially inwardly direction as shown by arrow 116, yieldably biasing tabs 112 of free-end portion 104 in the radially inward direction as shown by arrow 105 until flange 58 and free-end portion 104 engages upper portion 92 and retainer surface 72 of retainer block 66 respectively. Thus, inner side 92 of body portion 18 engages outer side 68 of gasket 64 to form a seal therebetween As shown in FIG. 3b, once coupled to fuel tank 16, ring 22 of retainer 14 fixes gasket 64 between flange 58 and retainer block 60, at all times being prevented from exiting passageway 20. Thus, body portion 50 is prevented from sliding through passageway 20 of retainer 14 as well as aperture 30 in fuel tank 16.

Alternatively, a manufacturer may couple valve assembly 12 and retainer 14 together prior to coupling retainer 14 to fuel tank 16. Valve assembly 12 and retainer 14 are coupled together as discussed above. At this time, body portion 50 is deposited into fuel tank 16 thorough aperture 30 until contacts 96 engage exterior surface 26 of fuel tank 16. Retainer 14 and fuel tank 16 are then welded together as discussed above.

Figure 9:
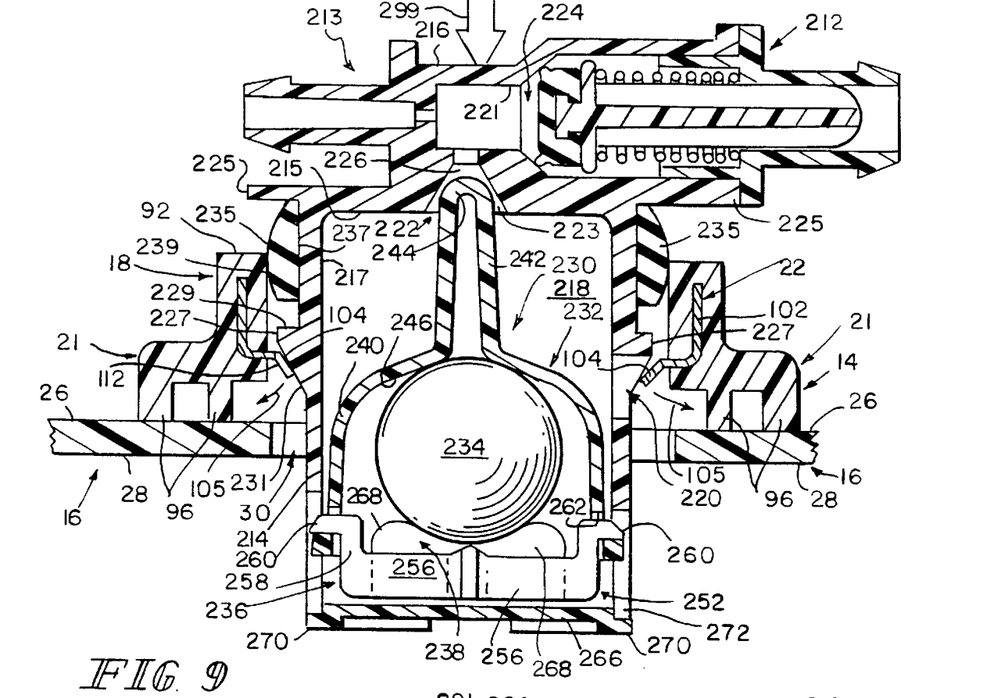
FIG. 9 is a sectional detail view of the fuel tank and retainer of FIG. 1 and a valve assembly in accordance with the present invention showing a ball-actuated closure valve included in the valve assembly and showing insertion of the valve assembly into the fuel tank through the passageway formed in the retainer and the aperture formed in the fuel tank wall prior to deflection of the free-end portion of the ring included in the retainer.
Figure 10:
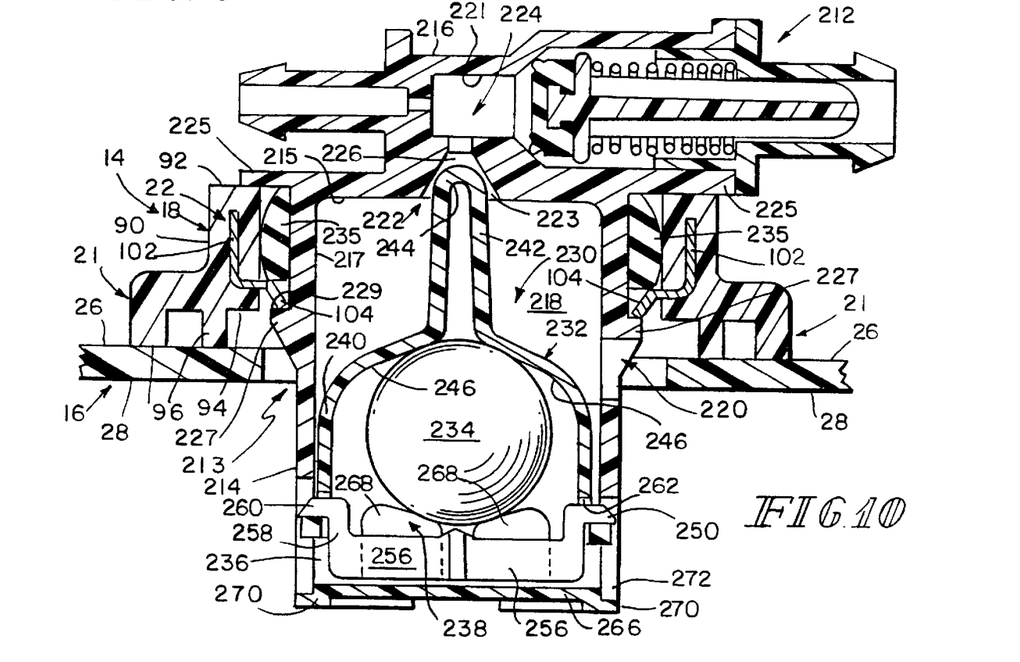
FIG. 10 is a view similar to FIG. 9 following coupling of the valve assembly to the axially upper portion of the retainer.

Referring now to FIGS. 9 and 10, retainer 14 is suitable for use with valve assembly 212. Valve assembly 212 is described in U.S. Pat. No. 4,655,238 to Szlaga, which is incorporated herein by reference. Valve assembly 212 includes a hollow valve housing 213 extending through aperture 30 of fuel tank 16. Valve housing 213 has a lower rollover safety portion 214 and an upper pressure-relief portion 216. Valve assembly 212 is constructed of acetal, although it is understood that other materials can be used.

Lower roll-over safety portion 214 includes a top wall 215 and a generally cylindrical side wall or body portion 217 that cooperate to define a valve chamber 218 having an inlet 220 formed in side wall 217 and an outlet 222 formed in top wall 215. Top wall 215 extends radially outwardly from chamber 218 to define an upper flange 225. Inlet 220 is in fluid/vapor communication with a fuel tank or the like. Lower portion 214 is also formed to include an axially downwardly-facing, generally conical valve seat 223 in concentric registry with outlet 222. In addition, side wall 217 includes a lower flange or retainer block 227 extending radially outwardly from chamber 218. Lower flange 227 includes a generally flat upper surface 229 and a tapered portion 231 that extends between generally flat portion 229 and side wall 217. A gasket 235 is positioned to lie between upper and lower flanges 225, 227 and includes an inner end 237 engaging side wall 217 and an opposite outer end 239. Outer end 239 is generally convex in shape. It is within the scope of this disclosure to construct outer end 239 in a wide variety of shapes and gasket 235 in a variety of sizes to accommodate various valve assemblies.

Upper pressure-relief portion 216 is formed to include an interior wall 221 defining a vapor discharge chamber 224, and a passageway 226 interconnecting vapor discharge chamber 224 and outlet 222 of valve chamber 218 in fluid/vapor communication. During vehicle operation, fuel vapors accumulated in the fuel tank are introduced into valve chamber 218 under pressure. These fuel vapors are selectively transmitted via fluid-conducting passageway 226 to vapor discharge chamber 224 for subsequent distribution to the canister (not shown) and to the atmosphere.

A roll-over assembly 230 is installed in lower portion 214 to control fluid flow through fluid-conducting passageway 226. Roll-over assembly 230 automatically closes valve chamber outlet 222 during vehicle rollover and change in vehicle motion to prevent the flow of liquid fuel and/or fuel vapors through passageway 26 and into both of the canister and the atmosphere. As shown best in FIGS. 9 and 10, roll-over assembly 230 includes a valve member 232, a stainless steel ball 234, a ball retainer 236, and a valve member retainer 238.

Valve member 232 includes a downwardly opening ball-receiving cup 240 and an integral upstanding valve stem 242. Valve stem 242 has a distal, spherical end 244 for engaging valve seat 223 to close chamber outlet 222. An interior wall of cup 240 is configured to define a novel first inclined ramp portion 246.

Ball retainer 236 includes a crisscross frame 252 for retaining ball 234 in inverted cup 240. Crisscross frame 252 includes arms 256 each having a distal end 258 and an outwardly turned L-shaped mounting tab 260 extending upwardly therefrom for snapping into engagement with holes 262 formed in the lowermost portion of inverted cup 240.

Valve member retainer 238 illustratively includes a base member 266 and wedge members 268 for retaining valve member and ball retainer assembly 232, 236 in valve housing 213. The base member 266 includes mount flanges 270 for snapping into engagement with circumferentially spaced-apart channels 272 formed in the lowermost portion of valve housing 213.

Valve assembly 212 and retainer 14 are manufactured separately and subsequently assembled in an axial press-fit. In order to assemble fuel tank valve apparatus 10, an assembly worker illustratively grasps retainer 14 and places contacts 96 of weld flange 21 upon fuel tank 16 such that passageway 20 is aligned with aperture 30 in fuel tank 16. See FIG. 9. Retainer 14 and fuel tank 16 are welded together using suitable known techniques such as hot plate welding. Thus, retainer 14 is effectively integrated into fuel tank 16 by the welding process. Once coupled to fuel tank 16, retainer 14 is prevented from moving on exterior surface 26 of fuel tank 16.

Once retainer 14 has been welded to fuel tank 16, valve assembly 212 is coupled to retainer 14. The worker aligns side wall 217 with passageway 20 of body portion 18, as show in FIG. 9. Once aligned, the worker simply slides side wall 217 through passageway 20 as shown by arrow 299 into aperture 30 until tapered portion 31 of lower flange 27 engages free-end portion 104 of ring 22. At this time, as shown in FIG. 10, side wall 217 is further pressed in an axially inwardly direction yieldably biasing tabs 112 of free-end portion 104 in the radially inward direction as shown by arrow 105 until upper flange 215 engages body portion 18 and tab 112 engages flat portion 229 of lower flange 227.

Alternatively, a manufacturer may couple valve assembly 212 and retainer 14 together prior to coupling retainer 14 to fuel tank 16. Valve assembly 212 and retainer 14 are coupled together as discussed above. At this time, side wall 217 is deposited into fuel tank 16 thorough aperture 30 until contacts 96 engage exterior surface 26 of fuel tank 16. Retainer 14 and fuel tank 16 are then welded together as previously discussed.

Although the invention has been described in detail with reference to a preferred embodiment, variations and modifications exist within the scope and spirit of the invention as described and defined in the following claims.

What is claimed is:

1. An apparatus for mounting a vent valve assembly in an aperture of a fuel tank, the apparatus comprising
    a valve assembly including a housing having a body, a flange coupled to the body, and a retainer block extending from the body and being spaced-apart from the flange and a valve positioned to lie in the housing, and
    a retainer adapted to be coupled to an exterior surface of the fuel tank, the retainer including a body portion defining a passageway being sized to receive the body of the housing therein and a ring coupled to the body portion and extending into the passageway, the flange and retainer block of the housing cooperating with the body portion and the ring of the retainer to couple the valve assembly and retainer together.

2. The apparatus of claim 1, wherein the ring includes a fixed-end portion coupled to the body portion and a free-end portion positioned to lie in the passageway.

3. The apparatus of claim 2, wherein the fixed-end portion is formed to include notches.

4. The apparatus of claim 2, wherein the free-end portion includes flexible tabs spaced apart from one another.

5. The apparatus of claim 1, wherein the retainer block includes a retainer surface positioned to face toward the flange and a cam surface extending between the retainer surface and the body.

6. The apparatus of claim 5, wherein the ring engages the retainer surface when the flange engages the body portion to couple the body portion in the passageway of the retainer.

7. The apparatus of claim 1, wherein the body portion is constructed of a polymer and the ring is constructed of a metal.

8. An apparatus for mounting a vent valve assembly in an aperture of a fuel tank, the apparatus comprising
    a valve assembly including a housing having a body, a flange coupled to the body, and a retainer block extending from the body and being spaced-apart from the flange and a valve positioned to lie within the housing, and
    a retainer including a body portion formed to include an upper portion, a lower portion, a passageway extending between the upper and lower portions and being sized to receive the body of the housing, and a weld flange extending from the lower portion and adapted to be coupled to an exterior surface of the fuel tank and a ring coupled to the body portion and extending into the passageway, the flange and retainer block of the housing cooperating with the upper portion and the ring of the retainer to couple the valve assembly and retainer together.

9. The apparatus of claim 8, wherein the weld flange includes a contact extending away from the body portion and in spaced-apart relation to the body of the housing.

10. The apparatus of claim 9, wherein the weld flange includes two concentrically aligned contacts.

11. The apparatus of claim 8, wherein the ring is flexible and formed for movement in the passageway upon movement of the retainer block in the passageway toward the lower portion of the body portion.

12. The apparatus of claim 11, wherein the ring is constructed of a metal.

13. The apparatus of claim 8, wherein the retainer block includes a retainer surface positioned to face the flange and a tapered cam surface extending between the retainer surface and the body.

14. The apparatus of claim 13, wherein the ring includes a fixed-end portion coupled to the body portion and a free-end portion positioned in the passageway.

15. The apparatus of claim 14, wherein the cam surface is sized to press the ring toward the body portion upon movement of the retainer block in the passageway toward the lower portion of the body portion.

16. A fuel tank assembly comprising
    a fuel tank formed to include a wall having an exterior surface, an interior surface, and an aperture extending between the exterior and interior surfaces,
    a valve assembly including a housing having a body extending through the aperture, a flange coupled to the body, and a retainer block extending from the body and being spaced-apart from the flange, and
    a retainer including a body portion formed to include a weld flange coupled to the exterior surface of the fuel tank and a passageway in general alignment with the aperture of the fuel tank and sized to receive the body of the housing and a ring coupled to the body portion and extending into the passageway, the flange and retainer block of the housing cooperating with the body portion and the ring of the retainer to couple valve assembly and retainer together.

17. The assembly of claim 16, wherein the fuel tank and the body portion of the retainer are constructed of polymeric materials.

18. The assembly of claim 17, wherein the ring is constructed of a metal.

19. The assembly of claim 16, wherein the weld flange includes contacts spaced apart from one another in engagement with the exterior surface of the fuel tank.

20. The assembly of claim 19, wherein the contacts extend about the periphery of the aperture in the fuel tank.

21. A tank valve apparatus comprising
a valve assembly and
a retainer adapted to be coupled to an exterior surface of a tank, the retainer including a body portion defining a passageway receiving the valve assembly therein and a mount coupled to the body portion and extending into the passageway to retain the valve assembly in the passageway.

22. The apparatus of claim 21, wherein the mount includes a fixed-end portion coupled to the body portion and free-end portion having a plurality of tabs coupled to the fixed-end portion and arranged to extend into the passageway.

23. The apparatus of claim 22, wherein the tabs are positioned to lie in circumferentially spaced-apart relation to one another in the passageway.

24. The apparatus of claim 22, wherein each tab is cantilevered to the fixed-end portion and positioned to lie in the passageway.

25. The apparatus of claim 24, wherein each tab includes a radial section coupled to the fixed-end portion and a ramped section coupled to the radial section and arranged to lie normally at an obtuse angle relative to the radial section.

26. The apparatus of claim 22, wherein the tabs cooperate to define a deflectable conic section in the passageway.

27. The apparatus of claim 26, wherein the tabs are positioned to lie in circumferentially spaced-apart relation to one another in the passageway.

28. The apparatus of claim 22, wherein the body portion includes an interior side wall defining the passageway and each tab is hinged to the fixed-end portion to move through an angle from a normal position aligned at an acute angle relative to the interior side wall to a deflected position aligned to lie alongside the interior side wall during insertion of the valve assembly into the passageway to assume a retained position therein.

29. The apparatus of claim 28, wherein the valve assembly includes a housing containing a valve movable relative to the housing, a flange coupled to the housing and arranged to engage the body portion of the retainer upon movement of the valve assembly to assume the retained position in the passageway, and a retainer block coupled to the housing and arranged to lie in spaced-apart relation to the flange to trap the tabs therebetween upon movement of the valve assembly to assume the retained position in the passageway.

30. The apparatus of claim 29, wherein the retainer block includes an angled, radially outwardly facing cam surface arranged to move the tabs from the normal positions to the deflected positions during insertion of the valve assembly into the passageway and an upwardly facing retainer surface arranged to contact the tabs upon movement of the valve assembly to assume the retained position in the passageway.

31. The apparatus of claim 22, wherein the fixed-end portion is encased in an interior region of the body portion.

32. The apparatus of claim 31, wherein the fixed-end portion is ring-shaped.

33. The apparatus of claim 32, wherein the fixed-end portion includes an annular inner surface, an annular outer surface, and a plurality of notches extending between the inner and outer surfaces.

34. The apparatus of claim 21, wherein the body portion is made of a weldable polymeric material and the mount is made of a deflectable metal material.

35. The apparatus of claim 21, wherein the body portion includes a sleeve defining the passageway and a weld flange arranged to depend from the sleeve and adapted to be coupled to an exterior surface of a tank to align the passageway with an opening in the tank.

36. The apparatus of claim 35, wherein the weld flange includes two annular contacts arranged to lie in concentric alignment with one another.

37. The apparatus of claim 35, wherein the mount includes a fixed-end portion coupled to the body portion and free-end portion having a plurality of tabs coupled to the fixed-end portion and arranged to extend into the passageway.

38. The apparatus of claim 21, wherein the mount is ring-shaped.

39. The apparatus of claim 21, wherein the valve assembly includes a housing containing a valve movable relative to the housing, a flange coupled to the housing and arranged to engage the body portion of the retainer upon movement of the valve assembly to assume a retained position in the passageway, and a retainer block coupled to the housing and arranged to lie in spaced-apart relation to the flange to trap the tabs therebetween upon movement of the valve assembly to assume the retained position in the passageway, the retainer block includes a retainer surface positioned to face the flange and a tapered cam surface extending between the retainer surface and the body portion, the mount includes a fixed-end portion coupled to the body portion and a deflectable free-end portion position in the passageway, and the tapered cam surface is sized and arranged to press the deflectable free-end portion toward the body portion upon downward movement of the retainer block in the passageway during insertion of the valve assembly into the passageway.

* * * * *